(12) United States Patent  
Chang et al.

(10) Patent No.: US 9,134,491 B2
(45) Date of Patent: Sep. 15, 2015

(54) OPTICAL MODULE FOR TRANSFERRING OPTICAL SIGNAL TO ELECTRICAL SIGNAL AND OPTICAL MODULE ASSEMBLY USED THEREOF

(71) Applicant: HON HAI PRECISION INDUSTRY CO., LTD., New Taipei (TW)

(72) Inventors: Chun-Yi Chang, New Taipei (TW); Jia-Hau Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/226,842

(22) Filed: Mar. 27, 2014

(65) Prior Publication Data

US 2014/0294343 A1   Oct. 2, 2014

(30) Foreign Application Priority Data

Mar. 27, 2013   (TW) .............................. 102110828 A

(51) Int. Cl.
*G02B 6/42* (2006.01)

(52) U.S. Cl.
CPC ............ *G02B 6/4269* (2013.01); *G02B 6/4292* (2013.01)

(58) Field of Classification Search
CPC ...................................................... G02B 6/4269
See application file for complete search history.

(56) References Cited

U.S. PATENT DOCUMENTS 7,583,867 B2 *   9/2009   Terada et al. .................... 385/14

FOREIGN PATENT DOCUMENTS

| CN | 201464681 U | 5/2010 |
| CN | 102667565 A | 9/2012 |
| TW | 200408847 A | 6/2004 |
| TW | 201142399 A1 | 12/2011 |
| TW | 201250316 A | 12/2012 |
| WO | WO2011/145785 | 11/2011 |

* cited by examiner

*Primary Examiner* — Jerry Rahll
(74) *Attorney, Agent, or Firm* — Wei Te Chung; Ming Chieh Chang

(57) ABSTRACT

An optical module (8) set on a substrate (6) for assembling with a fiber (72) and includes a resin seat (1), an optical member (2) assembled on the resin seat (1) for receiving and transferring light signals sent by the fiber (72) to electrical signals and a connecting member (3) set on the optical member (2), the optical member (2) includes a first surface (21) perpendicular to the fiber (72) and a second surface (22) opposite to the first surface (21), the first surface (21) faces to the fiber (72), the connecting member (3) set on the first surface (21) of the optical member (2) and soldered to the substrate (6).

20 Claims, 5 Drawing Sheets

OPTICAL MODULE FOR TRANSFERRING OPTICAL SIGNAL TO ELECTRICAL SIGNAL AND OPTICAL MODULE ASSEMBLY USED THEREOF

BACKGROUND OF THE INVENTION

1. Field of the Invention

The present invention relates to an optical module for transferring optical signal to electrical signal, and more particularly to an optical module in align with the fibers to receive the light signals emitted by the fibers directly.

2. Description of Related Art

Chinese patent publication No. 102667565A issued to Enplas on Sep. 12, 2012 discloses a conventional optical module for transferring light signals to electrical signals. The light signals emitted by the fibers are transferred in a horizontal direction. But, the optical module can only receive the light signal transferred in a vertical direction. So, the transferring direction of the light signals is changed by a resin body and there must set lens to gather the light signals. Thus, the light signals can be received by the optical module to be transferred to electrical signals. The lens adds the cost. At the same time, the position of the lens must in align with the optical module make it hard to be assembled.

Hence, it is desirable to provide an improved optical module to overcome the aforementioned disadvantages.

SUMMARY OF THE INVENTION

Accordingly, an object of the present invention is to provide an optical module in align with the fibers to receive the light signals emitted by the fibers directly.

According to one aspect of the present invention, an optical module set on a substrate for assembling with a fiber and includes a resin seat, an optical member assembled on the resin seat for receiving and transferring light signals sent by the fiber to electrical signals and a connecting member set on the optical member, the optical member includes a first surface perpendicular to the fiber and a second surface opposite to the first surface, the first surface faces to the fiber, the connecting member set on the first surface of the optical member and soldered to the substrate.

Other objects, advantages and novel features of the invention will become more apparent from the following detailed description when taken in conjunction with the accompanying drawings, in which:

DETAILED DESCRIPTION OF THE INVENTION

Reference will now be made to the drawings to describe the present invention in detail.

Figure 1:
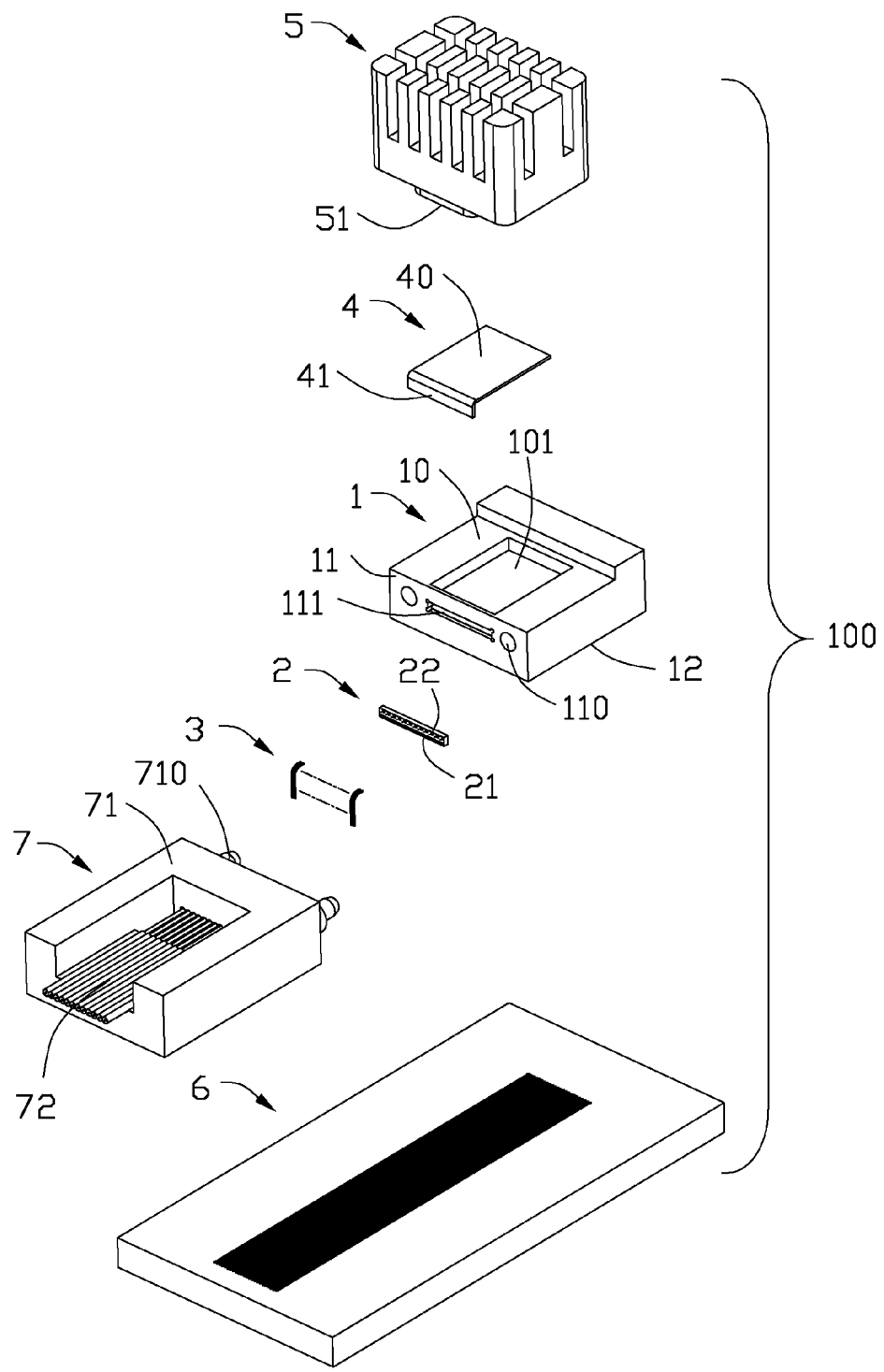
FIG. 1 is an exploded view of the optical module assembly according to the present invention.
Figure 2:
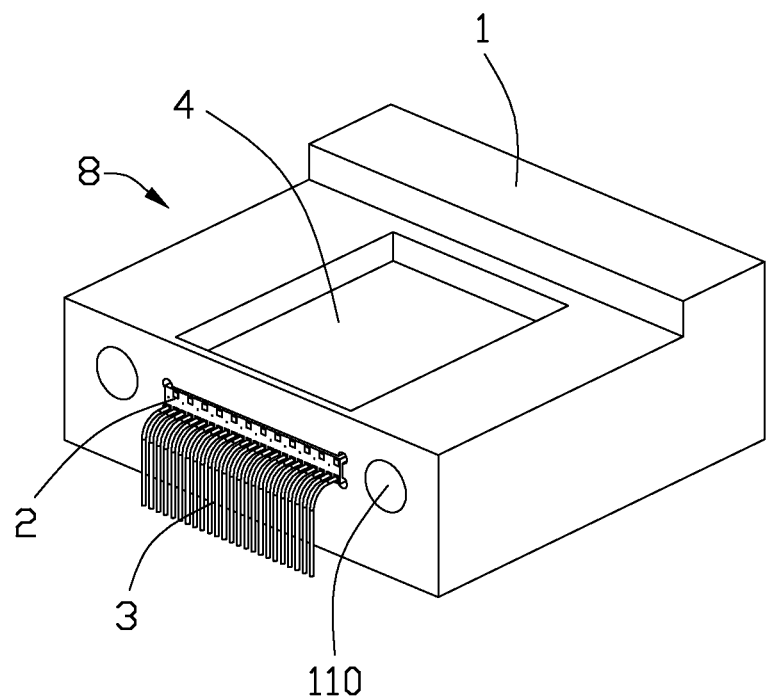
FIG. 2 is an assembled view of the optical module according to the present invention.

FIGS. 1 to 2 illustrate an optical module assembly 100 in accordance to a preferred embodiment of the present invention. The optical module assembly 100 transfers the light signals sent by fibers 72 to electrical signals. The optical module assembly 100 includes a substrate or printed circuit board 6, an optical module 8 set on the substrate 6 and a fiber assembly 7 assembled to the optical module 8. The fiber assembly 7 includes a resin body 71 and a plurality of fibers 72 set on the resin body 71. The resin body 71 includes a pair of posts 710. The optical module 8 is used to receive light signals sent by the fibers 72 and transfer the light signals to electrical signals. The optical module 8 includes a resin seat 1, a heat-conducting fin 4 and a optical member 2 assembled on the resin seat 1 and a plurality of connecting members 3 set on the optical member 2.

The resin seat 1 includes a bottom surface 12 assembled to the substrate 6, a top surface 10 opposite to the bottom surface 12 and a front surface 11 connecting the top surface 10 and the bottom surface 12. The resin seat 1 further includes an upper recess portion 101 recessed from the top surface 10, a front recess portion 111 recessed from the front surface 11 and a pair of holes 110 on two opposite sides of the front recess 111. The upper recess portion 101 connects with the front recess portion 111.

The heat-conducting fin 4 includes a plate body portion 40 and an extending portion 41 bending from the body portion 40. The optical member 2 includes a first surface 21 perpendicular to the fibers 72 and a second surface 22 opposite to the first surface 21.

Referring to FIG. 2, after the optical module 8 is assembled, the body portion 40 of the heat-conducting fin 4 receives in the upper recess portion 101 of the resin seat 1, the extending portion 41 of the heat-conducting fin 4 receives in the front recess portion 111 of the resin seat 1, the optical member 2 receives in the front recess portion 111 of the resin seat 1 and the second surface 22 touches with the extending portion 41 of the heat-conducting fin 4, the connecting member 3 is set on the first surface 21 of the optical member 2 which faced to the fibers 72. Thus, the height of the optical module 8 is low.

Figure 3:
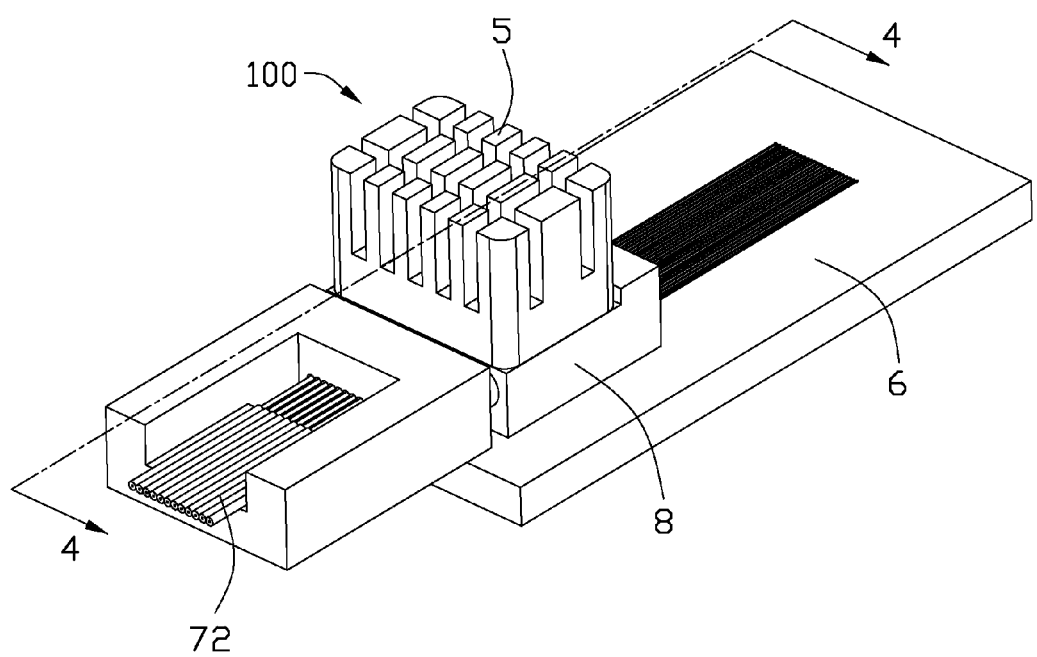
FIG. 3 is an assembled view of the optical module assembly as shown in FIG. 1.
Figure 4:
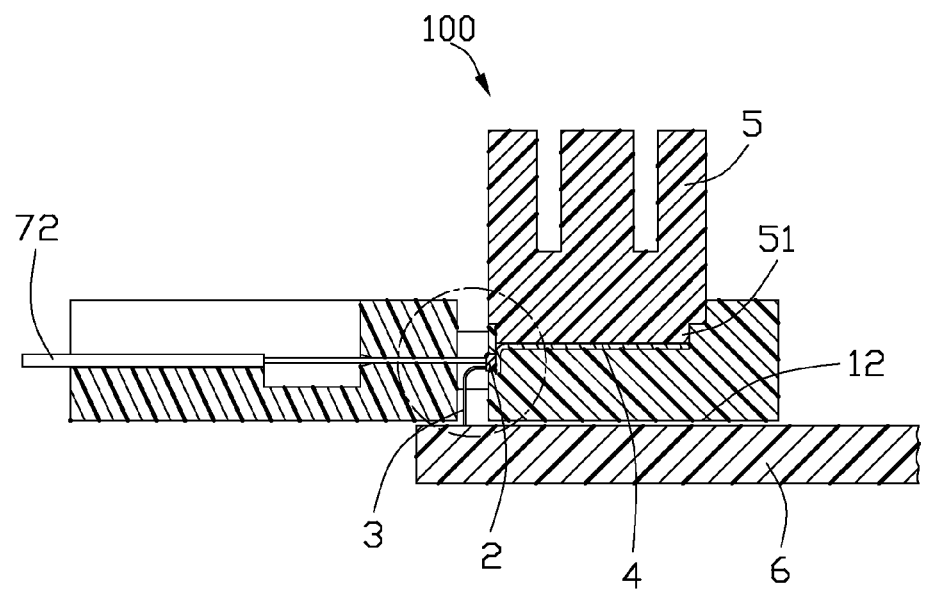
FIG. 4 is a cross-sectional view of the optical module assembly as shown in FIG. 3 along line 4-4.
Figure 5:
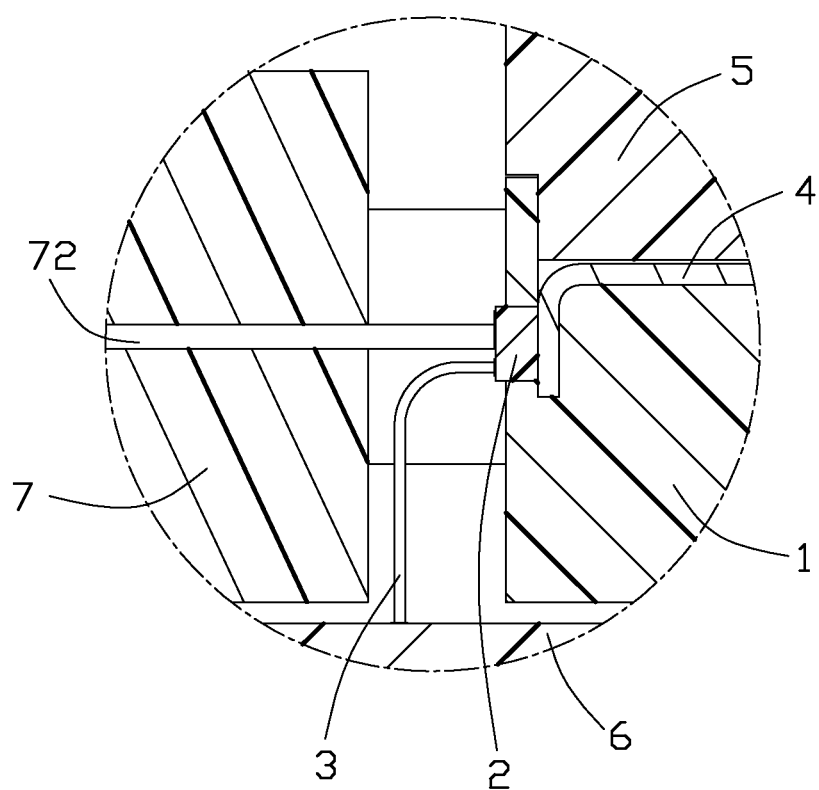
FIG. 5 is an enlarge view of the circular portion as shown in FIG. 4.

Referring to FIGS. 3-5, after the optical module assembly 100 is assembled, the optical module 8 is adhered to the substrate 6, the connecting members 3 are soldered to the substrate, the post 710 of the fiber assembly 7 receives in the hole 110 of the optical module 8, so the fibers 72 are in align with the optical member 2 to make the optical member 2 can receive the light signals sent by the fibers 72.

The optical module assembly 100 further includes a heat sink 5 assembled to the resin seat 1. The heat sink 5 includes a heat-conducting portion 51 receiving in the upper recess portion 101 and touching with the body portion 40 of the heat-conducting fin 4 to dissipate heat.

While the preferred embodiments in accordance with the present invention has been shown and described, equivalent modifications and changes known to persons skilled in the art according to the spirit of the present invention are considered within the scope of the present invention as defined in the appended claims.

What is claimed is:

1. An optical module set on a substrate for assembling with a fiber, comprising:
a resin seat;
a fiber assembly having a resin body assembled to the resin seat and including said fiber;
an optical member assembled on the resin seat for receiving and transferring light signals sent by the fiber to electrical signals, the optical member including a first surface perpendicular to the fiber and a second surface opposite to the first surface, the first surface faced to the fiber; and a connecting member set on the first surface of the optical member and soldered to the substrate; wherein the optical module further includes a heat-conducting fin assembled on the resin seat and touching the optical member; wherein the connecting member set is located between the resin seat and the resin body.

2. The optical module as claimed in claim 1, wherein the second surface of the optical member touches with the heat-conducting fin.

3. The optical module as claimed in claim 2, wherein the heat-conducting fin includes a body portion and an extending portion bending from the body portion.

4. The optical module as claimed in claim 3, wherein the second surface of the optical member touches with the extending portion of the heat-conducting fin, the body portion touches with a heat sink assembled on the resin body.

5. The optical module as claimed in claim 3, wherein the resin seat includes a bottom surface assembled on the substrate, a top surface opposite to the bottom surface and a front surface connecting the bottom surface and the top surface, the resin seat further includes an upper recess portion recessed from the top surface and a front recess portion recessed from the front surface of the resin body, the upper recess portion connects with the front recess portion.

6. The optical module as claimed in claim 5, wherein the body portion of the heat-conducting fin receives in the upper recess portion and the extending portion of the heat-conducting fin receives in the front recess portion.

7. The optical module as claimed in claim 6, wherein the resin seat further includes a pair of holes on two opposite sides of the front recess portion.

8. An optical module assembly for transferring light signals to electrical signals, comprising:
a substrate;
a resin seat set on the substrate;
a fiber assembly assembled to the resin seat and having a resin body holding a plurality of fibers;
an optical member assembled on the resin seat for receiving and transferring light signals sent by the fiber to electrical signals, the optical member including a first surface perpendicular to the fiber and a second surface opposite to the first surface, the first surface faced to the fiber; and
a connecting member set on the first surface of the optical member and soldered to the substrate; wherein
the optical member is located between the fiber assembly and the resin seat in a horizontal direction; wherein
the connecting member is essentially located between the resin seat and the resin body in said horizontal direction.

9. The optical module assembly as claimed in claim 8, further including a heat-conducting fin assembled on the resin seat and touching the optical member.

10. The optical module assembly as claimed in claim 9, wherein the heat-conducting fin includes a body portion and an extending portion bending from the body portion.

11. The optical module assembly as claimed in claim 10, wherein the second surface of the optical member touches with the extending portion of the heat-conducting fin, the body portion touches with a heat sink assembled on the resin body.

12. The optical module assembly as claimed in claim 10, wherein the resin seat includes a bottom surface assembled on the substrate, a top surface opposite to the bottom surface and a front surface connecting the bottom surface and the top surface, the resin seat further includes an upper recess portion recessed from the top surface and a front recess portion recessed from the front surface of the resin body, the upper recess portion connects with the front recess portion.

13. The optical module assembly as claimed in claim 12, wherein the body portion of the heat-conducting fin receives in the upper recess portion and the extending portion of the heat-conducting fin receives in the front recess portion.

14. The optical module assembly as claimed in claim 13, wherein the resin seat further includes a pair of holes on two opposite sides of the front recess portion, and the resin body includes a pair of posts being assembled to the holes of the resin seat.

15. The optical module assembly as claimed in claim 9, wherein the heat-conducting fin contacts the second surface of the optical member.

16. An optical module assembly comprising:
a fiber assembly including a resin body regulating a plurality of optical fibers extending along a front-to-back direction with corresponding fiber tips thereof;
an optical module located in front of the fiber assembly and including an optical member intimately confronting the corresponding tips in said front-to-back direction; and
a plurality of metallic connecting members connectively extending from the optical member toward and secured to a printed circuit board on which the optical module is mounted; wherein
the optical module is equipped with a heat sink in a vertical direction perpendicular to said front-to-back direction to dissipate heat derived from the optical member; wherein
the connecting members are essentially located between the optical module and the fiber assembly in said front-to-back direction.

17. The optical module assembly as claimed in claim 16, wherein the optical module includes a resin seat on which the optical member is positioned, and the optical member is located between the resin body and the resin seat in said front-to-back direction.

18. The optical module assembly as claimed in claim 17, further including a heat-conducting fin linked between the heat sink and the optical members.

19. The optical module assembly as claimed in claim 17, wherein means is formed between the resin body and the resin seat to align and assemble the resin body and the resin seat together.

20. The optical module assembly as claimed in claim 19, wherein said means are located by two opposite sides of the optical members in a transverse direction perpendicular to both said front-to-back direction and said vertical direction.

* * * * *